May 12, 1942.   S. L. SOHN   2,282,500
COOKING DEVICE
Filed Oct. 17, 1940
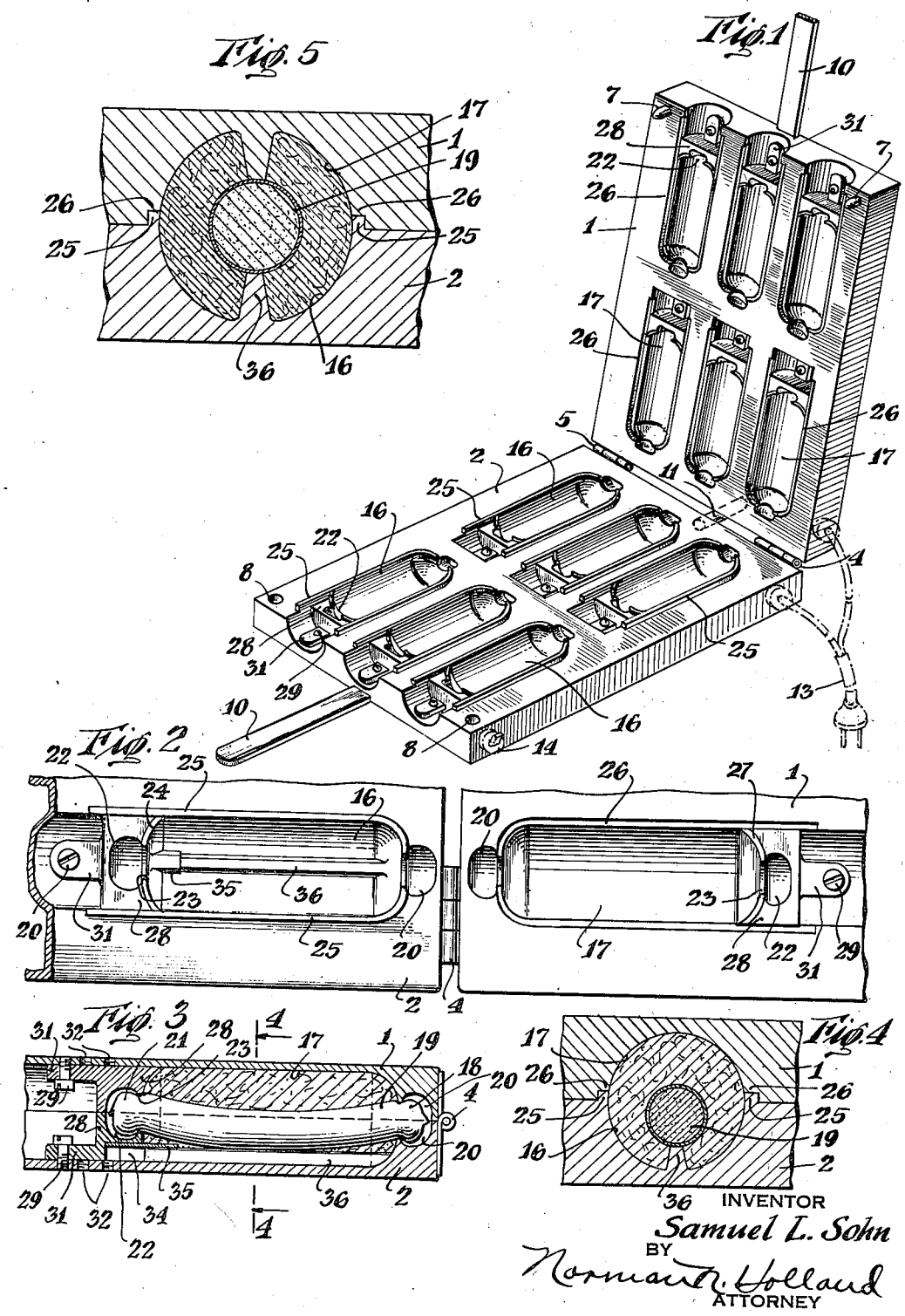
INVENTOR
Samuel L. Sohn
BY
Norman R. Holland
ATTORNEY Patented May 12, 1942

2,282,500

UNITED STATES PATENT OFFICE 2,282,500

COOKING DEVICE

Samuel L. Sohn, New York, N. Y., assignor of one-half to Moses J. Slepack, New York, N. Y.

Application October 17, 1940, Serial No. 361,532

10 Claims. (Cl. 53—10)

The present invention relates to cooking devices and more particularly to a device for forming and cooking a roll about a frankfurter, sausage, hamburger and the like.

The combination of frankfurter and roll is generally prepared by heating a frankfurter on a grill or hot plate, cutting open a roll and spreading it openwise upon the grill to heat it. When the frankfurter is heated and the roll toasted to the desired degree, the frankfurter is inserted between the sliced halves of the roll and mustard or relish applied. There are several objections to the above noted usual procedure. For example, the rolls frequently become dry and stale, particularly when ordered in quantity lots in expectation of numerous sales over holidays and weekends, only to have adverse weather conditions interfere with the sales and leave the dealer with many excess rolls on hand. This is a substantial loss for the rolls quickly become stale and useless and have to be thrown away. Another objection is that the rolls are not evenly heated or toasted when they are merely slit open and spread on a grill. A further objection is that a frankfurter tends to slip out from between the straight slit sides of the roll.

The present invention aims to overcome or minimize the above and other difficulties by providing a device adapted to form and cook a roll about a heated frankfurter so that the ends of the frankfurter are exposed and so that the roll may be easily opened to facilitate application of mustard, relish or the like.

An object of the present invention is to provide a new and improved device for forming a roll about a frankfurter.

Another object of the invention is to provide a device for forming a roll about a frankfurter which facilitates insertion of mustard, relish or the like.

Another object of the invention is to provide a device for forming a roll about a frankfurter so that the ends of the frankfurter project beyond the roll.

Another object of the invention is to provide a device adapted to be utilized to form rolls of different lengths.

Another object of the invention is to provide a device having improved means for supporting frankfurters, sausages or the like while forming rolls about them.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a perspective view of the device in open position, illustrating a preferred embodiment of the invention;

Fig. 2 is a fragmentary plan view, in open position, of a portion of the device shown in Fig. 1;

Fig. 3 is a fragmentary longitudinal sectional view through the device in closed position;

Fig. 4 is a sectional view along the line 4—4 of Fig. 3; and

Fig. 5 is a sectional view similar to that of Fig. 4 but illustrating a modified form of the invention.

Referring more particularly to the drawing, there is shown a preferred embodiment of the present device for forming or cooking rolls about frankfurters, sausages and other similar articles. The device comprises upper and lower plate portions 1 and 2 hinged or otherwise secured together adjacent one edge thereof at 4 and 5 to permit movement of the upper and lower plate portions with respect to each other and shutting upon each other in a manner similar to a waffle iron. Guide pins 7 and apertures 8 may be utilized to insure accurate alignment of the plates in closed position and handles 10 to facilitate movement of the plates. A lug or projection 11 at the side of the device opposite from the handles 10 may be used to support the end thereof and to facilitate rotation of the device in order to heat each side thereof. The heating means is preferably a gas flame or electric heating elements supplied by a cord and plug 13 controlled by a switch 14.

The roll forming and cooking portions of the device comprise a plurality of recesses 16 and 17 in each of the plate members 1 and 2 which are adapted to complement each other to form relatively large cavities when the plates are closed upon each other. While six recesses are shown in each plate member, it will be clear that any desired number may be used. In use, frankfurters or the like are placed in the recesses and dough or batter is placed in the lower recesses 16 of the lower plate 2; the upper plate member 1 is then moved downwardly against the lower plate 2 so that the recesses 16 and 17 in each of the plates cooperate to form cavities. Upon applying heat the dough expands within the cavities to form rolls about the frankfurters. It will be understood that frankfurters 15 may be placed in the recesses either before or after the dough or batter is applied.

One of the plate members, shown as the lower plate member 2 in the present device, is preferably provided with a raised rim 25 about each of its recesses and the recesses of the other plate member are preferably provided with grooves or channels 26 for receiving the raised rim portions 25; the rims 25 fit into the grooves 26 when the device is closed to permit the use of a maximum amount of dough and to minimize spreading or squeezing of dough outwardly between the plate members during heating or cooking operations.

To facilitate eating, it is desirable to position a frankfurter adjacent the central part of a roll. This is provided for in the present device by maintaining a frankfurter 19 (Fig. 3) substantially centrally disposed within a cavity while dough or batter forms and cooks around it. Apertures or sub-recesses 20 and 22 located adjacent the ends of each of the cavity forming recesses 16 and 17, and of a size sufficient to receive the ends 18 and 21 of a frankfurter, are adapted to minimize sidewise movement thereof. Each of these sub-recesses 20 and 22 has an inwardly extending rim or ridge 23 adjacent its inner side which, when the plate members 16 and 17 are closed together, complement each other to form a collar or ring adapted to fit closely about a frankfurter so as to maintain the large dough receiving cavities separate from the sub-recesses; this construction prevents dough from expanding into the sub-recesses and forming a roll which would enclose the ends of a frankfurter. Sales appeal of a frankfurter and roll is thus enhanced for the frankfurter is securely positioned in a roll and yet the customer is able to see the frankfurter.

Different batches of frankfurters, sausages and the like occasionally vary in length and it is thus necessary to provide convenient and easily adjustable means for correspondingly varying the effective lengths of the cavity forming recesses 16 and 17. The accommodation of different length frankfurters or sausages is provided for in the present embodiment of the invention by making one of the sub-recesses which receives the end 21 of a frankfurter longitudinally movable. The longitudinally adjustable insert members 28 are preferably mounted at one end of each of the cavity forming recesses 16 and 17. These insert members 28 have the sub-recesses 22 and collar forming portions 23, hereinabove described, which are adapted to receive the end portions 21 of frankfurters and hold them in position. The insert members 28 of the lower plate 2 may be provided with raised rims or ridges 24 adapted to fit into channels or grooves 27 in the insert members 28 of the upper plate 1 when the plate members 1 and 2 are closed against each other; this permits use of a maximum amount of dough and minimizes spreading thereof between the plate members similarly to the hereinbefore described rims 25 and recesses 26 of the large cavity forming recesses 16 and 17. The insert members 28 may be held in desired position by means of bolts 29 which extend through tab portions 31 and screw into threaded holes 32 in the upper and lower plate members (Fig. 3). Each of the adjustable insert members 28 in one plate member is further provided at its lower part with a channel 34 and outwardly extending arch member 35, the purpose of which will be hereinafter described.

A longitudinally extending rib 36 located adjacent the lower part of each of the recesses in one of the plate members, preferably the lower plate member 2 in the present embodiment, is adapted to perform two very desirable functions. Firstly, it supports a frankfurter intermediate its ends so as to maintain it near the center of a roll, and also conducts heat to the frankfurter to cook it. The portions 23 at the ends of the cavities engage the ends of the frankfurters to hold them in position in the cavities and in position on the ribs 36. This permits the free flow of batter about the frankfurters. Secondly, it forms a groove which extends lengthwise of the roll to permit insertion of mustard or relish; the roll may also be spread open along this groove to permit greater access for application of mustard or relish. The top of the ridge 36 may be of a shape to conform to a frankfurter (Figs. 4 and 5) so that heat will be conducted to the frankfurter over a relatively large area to insure continued cooking of it. Preferably, the frankfurter is grilled to a considerable extent before being placed in the recesses or else grilled in the recesses before dough or batter is applied. A further feature of the ridge 36 is that it permits grease from a frankfurter to run down and grease the recess.

If desired, a rib 37 may also be located in the upper plate member 1 to form a roll similar to a sandwich (Fig. 5).

It is believed that the operation of the device will be clear from the foregoing description of the features thereof. It will be seen that the present invention provides a new and improved device adapted to form and cook a roll about a frankfurter, sausage or the like and so that mustard or relish may be easily applied to the frankfurter in the formed roll.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A device of the class described comprising, in combination, cooperating upper and lower hinged portions each having complementary longitudinal recesses adapted to form a plurality of longitudinal cavities when the upper and lower members are in adjoining relationship, and transversely extending longitudinally adjustable means in each of said cavities each having means adapted to assist in supporting an elongated edible article substantially centrally in said cavity.

2. A device of the class described comprising, in combination, cooperating portions each having complementary recesses adapted to form cavities when said portions are in adjoining relationship, and adjustable means in said cavities for varying the sizes thereof, said means having recesses adapted to receive and support an article.

3. A device of the class described comprising the combination of cooperating upper and lower sections each having a recess adapted to complement the recess in the other to form a single cavity and one of said recesses having a longitudinal rib therein adapted to assist in supporting an article.

4. A device of the class described comprising the combination of cooperating upper and lower sections each having a recess adapted to form with the recess in the other a single cavity and each of said recesses having a longitudinal rib therein adapted to support an article.

5. A device of the class described comprising, in combination, upper and lower members having cooperating article receiving recesses, one of said recesses having longitudinally extending means therein adapted to assist in supporting an article, and means in said recess substantially in alignment with said longitudinally extending means adapted to minimize movement of an article in the recess.

6. A device of the class described comprising, in combination, upper and lower members having cooperating article receiving recesses, one of said recesses having a rib therein adapted to support an article and means in said recess and adjustable with respect thereto adapted to minimize movement of an article in the recess.

7. In a device of the class described, the combination of upper and lower members having cooperating article receiving recesses, one of said recesses having a rib therein, and a member carried within said recess and adjustable with respect thereto adapted to be moved to vary the effective size of said recess.

8. In a device of the class described, in combination, upper and lower members having cooperating article receiving recesses, each of said recesses having a rib therein, and a member carried within each of said recesses and adjustable with respect thereto adapted to be moved to vary the effective sizes of said recesses.

9. A device of the class described comprising, in combination, upper and lower members having cooperating article receiving recesses, ribs in said recesses, and article retaining members adjustably mounted with respect to said ribs, said members being adapted to be moved to vary the effective sizes of said recesses and being adapted to maintain an article in position with respect to the ribs.

10. A device of the class described comprising, in combination, upper and lower members having cooperating article receiving recesses, longitudinally extending ribs in said recesses adapted to support a frankfurter or the like, and article retaining members adjustably mounted on said ribs, said members being movable lengthwise with respect to said ribs to vary the effective sizes of said recesses and being adapted to maintain a frankfurter or the like in position with respect to the ribs.

SAMUEL L. SOHN.